United States Patent
Stenzel et al.

(10) Patent No.: US 6,170,199 B1
(45) Date of Patent: *Jan. 9, 2001

(54) MOTOR VEHICLE DOOR

(75) Inventors: Manfred Stenzel, Bamberg; Ferenc Szerdaheliy, Coburg; Roland Feder, Weitramsdorf; Stefan Burger, Ernstfeld; Sabine Neuss, Bamberg; Eberhard Pleiss, Untersiemau, all of (DE)

(73) Assignees: Brose Fahrzeugteile GmbH & Co. KG; Ketschendorfer Strasse, both of Coburg (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/182,856

(22) Filed: Oct. 29, 1998

(30) Foreign Application Priority Data

Oct. 29, 1997 (DE) .............................. 197 47 710

(51) Int. Cl.[7] ...................................... B60J 5/04
(52) U.S. Cl. .............................. 49/502; 49/352
(58) Field of Search ................ 49/348, 349, 352, 49/502; 296/146.5, 146.7; 280/730.2

(56) References Cited

U.S. PATENT DOCUMENTS

| | | | | |
|---|---|---|---|---|
| 5,062,240 | * | 11/1991 | Brusasco | 49/352 X |
| 5,090,158 | | 2/1992 | Bertolini | 49/348 |
| 5,430,977 | * | 7/1995 | Kitayama et al. | 49/352 |
| 5,555,677 | * | 9/1996 | DeRees et al. | 49/352 X |
| 5,617,675 | * | 4/1997 | Kobrehel | 49/352 |
| 5,868,421 | * | 2/1999 | Eyrainer | 280/730.2 |

FOREIGN PATENT DOCUMENTS

| | | |
|---|---|---|
| 2510220 | 9/1976 | (DE) . |
| 8309452 | 11/1986 | (DE) . |
| 4428262 | 1/1996 | (DE) . |
| 0 243 235 | 10/1987 | (EP) . |
| 2 626 534 | 1/1989 | (FR) . |
| 2117329 | 10/1983 | (GB) . |
| WO 99/27128 | 5/1999 | (WO) . |

* cited by examiner

*Primary Examiner*—Jerry Redman
(74) *Attorney, Agent, or Firm*—Christie, Parker & Hale, LLP

(57) ABSTRACT

The invention concerns a motor vehicle door with a door body, an inner door panel, and a window lifter disposed in the door body, which lifter includes a guide rail, on which a carrier for a window pane is displaceably disposed. According to the invention, at least one functional element which is not part of the regulating mechanism of the window lifter is connected to both the guide rail and the door body.

23 Claims, 5 Drawing Sheets

MOTOR VEHICLE DOOR

FIELD OF THE INVENTION

The invention concerns a motor vehicle door with a door body, an inner door panel, and a window lifter disposed within the door body.

BACKGROUND OF THE INVENTION

A motor vehicle door is known, for example, from German patent DE 44 28 262 C1. This vehicle door includes a cable window lifter with one guide rail along which a carrier is moved by means of an appropriate motorized drive, which carrier in turn is connected with the window pane to be regulated. Thus, the regulating force of the drive motor is transferred to the window pane to be regulated via the carrier mounted on the guide rail.

SUMMARY OF THE INVENTION

The object of the invention is to improve a vehicle door by reducing the number of parts and the weight of the door without impairing the stability or the rigidity of the vehicle door.

Accordingly, at least one functional element of the vehicle door not part of the regulating mechanism of the window lifter is connected with both the guide rail and the door body. This functional element may, for example, be a door pull handle, a speaker, a side air bag, or a door control device, i.e., in particular, functional elements which are, in fact, not components of a motor vehicle window lifter.

The functional element mentioned does not have to be connected directly to the guide rail and the door body; instead, even an indirect connection via at least one other component is conceivable. Thus, for example, the functional element may be disposed on a carrier element which is attached on the one hand to the door body and on the other to the guide rail. In the case of a two-strand window lifter, it is further conceivable to connect the functional element to both guide rails of the two-strand window lifter. Since the guide rails are in turn connected to the door body, this also results in an indirect attachment to the body.

In any case, it is advantageous with regard to the stabilization of the door body, which is frequently provided with a large cutout, if the functional element is connected with the door body, not only via a single guide rail, but also extends partially outside the guide rail over the large cutout in the door body.

In the solution according to the invention, the guide rail, which is customarily present and stably designed in a window lifter, is advantageously used to stably mount additional functional elements of the vehicle door without having to provide additional reinforcement zones in the vehicle door for this.

At the same time, it is possible to achieve stabilization of the door body by means of an appropriate arrangement of functional elements not primarily provided for reinforcement of the vehicle door, but rather for other purposes.

The functional element (or its carrier element) preferably has at least two attachment points at a distance from each other for connection with the guide rail on the one hand and with the door body on the other.

The functional element may, for example, be the door pull handle of a vehicle door, which is customarily formed on the inner door panel. For this, the inner door panel must be appropriately stably designed in the region of the pull handle. However, this measure is unnecessary if the pull handle is attached according to present invention to the guide rail on the one hand and to the body of the door on the other.

In addition, the vehicle door is further stabilized by the connection of the door body to the guide rail by means of the pull handle, because the pull handle here also assumes the function of a cross strut stabilizing the door.

This may also be accomplished with other functional elements of the vehicle door, such as a door control device or a speaker disposed on an appropriate carrier element.

In another exemplary embodiment of the invention, the functional element is designed as an air bag unit which is attached on the one hand to the guide rail and on the other to the door body. This ensures adequate stability in the connection zones between the air bag unit and vehicle door. Moreover, the air bag unit also assumes a stability function similar to the above-described pull handle.

Of course, several of the aforementioned functional components may be disposed simultaneously in the manner mentioned in the region of the vehicle door. Thus, a particularly clear increase in the stability of the vehicle the door is achieved.

The attachment points provided on the guide rail for the additional functional elements of the vehicle door may be formed on a base plate of the guide rail which is formed in known fashion to accommodate the window lifter drive on the guide rail.

Moreover, the guide rail may have on at least one of its end regions a widened area extending essentially along the plane of the window pane, which area is connected to the door body by at least one, but preferably two attachment points. This results in a particularly strong connection between the guide rail and the door body, which is advantageous in particular when high forces are to be accommodated by the guide rail, for example, in the case of the attachment of a side air bag.

According to another aspect of the invention, provision is made that at least one part of the inner door panel is connected with the guide rail. Thus, a preassemblable unit, which consists of the guide rail and the inner door panel, may be created. This can be assembled in advance outside the actual assembly site of the vehicle door and then installed as a unit in the corresponding vehicle door. This further simplifies and speeds up the assembly of a vehicle door.

This is true especially if the corresponding part of the inner door panel is attached exclusively to the guide rail. In this case, the guide rail merely needs to be attached to the door body in known fashion. The inner door panel connected to the guide rail is then also automatically attached to the vehicle door.

BRIEF DESCRIPTION OF THE DRAWINGS

Additional advantages of the invention are revealed through the following description of exemplary embodiments with reference to the figures.

They depict.

DETAILED DESCRIPTION OF THE PREFERRED EMBODIMENTS

Figure 1:
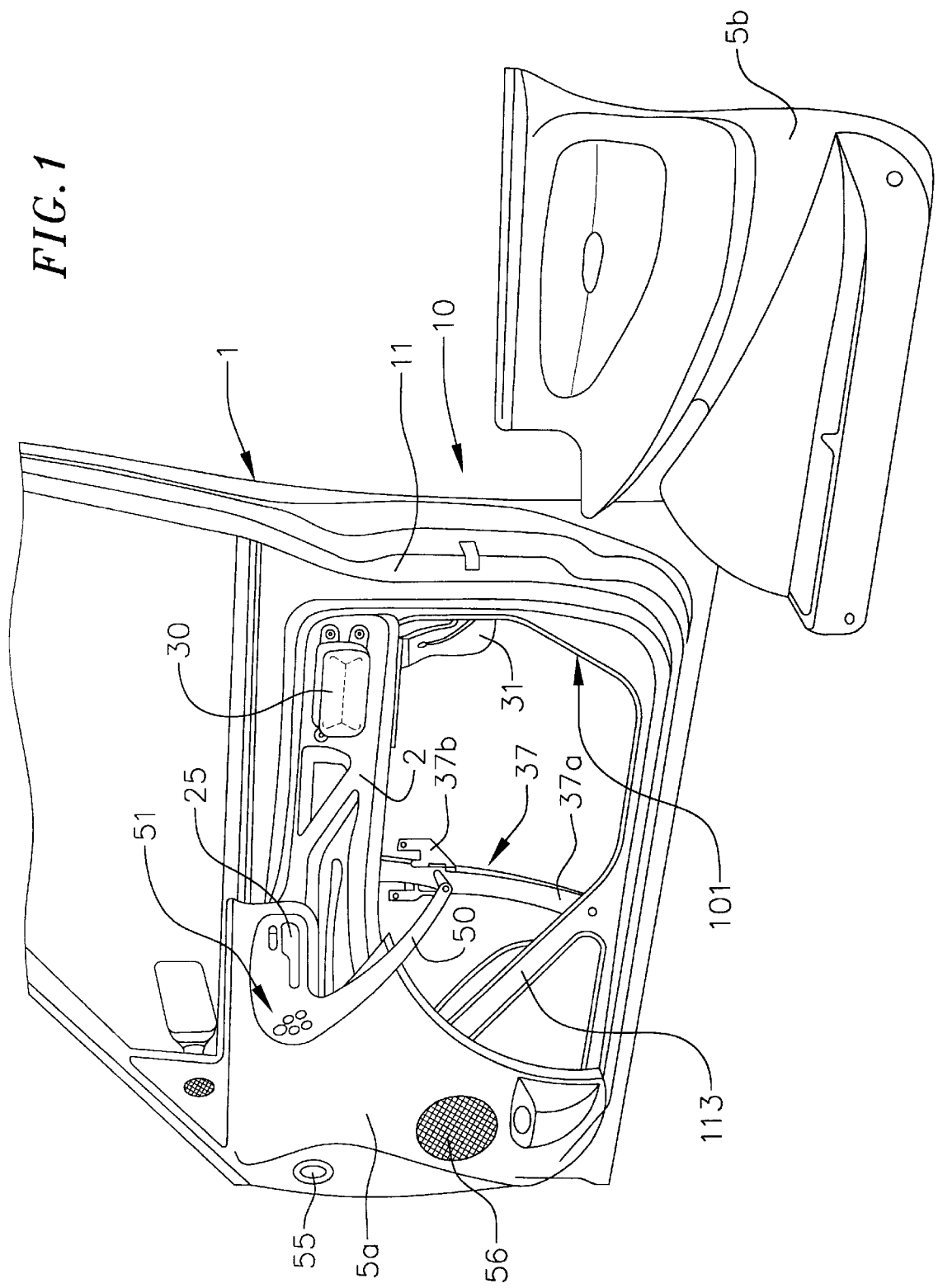
FIG. 1 a perspective depiction of a vehicle door with an inner door panel and a guide rail of a window lifter on which a pull handle is attached.

FIG. 1 depicts perspectively a vehicle door with a door body 1, which includes an outer door panel 10, an inner door panel 11, and a carrier plate 2 by which a large cutout 101 in the inner door panel 11 is covered.

On the side of the carrier plate 2 which is part of the door body 1 turned toward the interior of the vehicle (dry area), various functional elements of the vehicle door, such as a side air bag 30 and a speaker provided with a cover 56, are disposed.

Referring to FIG. 1, it is also possible to see that a guide rail 37a of a vehicle window lifter 37 extends on the wet side of the inner door panel 11, on which rail a carrier 37b is mounted, which carrier 37b is connected with the window pane to be regulated. Since the guide rail 37a extends like a cross strut over the large cutout 101, it simultaneously serves to stabilize the door body 1 in the region of the cutout 101. For this, yet another cross strut 113 is provided.

A pull handle 50 is attached to the guide rail 37a of the window lifter 37, which handle is formed in one piece with the shell of the inside door opener 25 and is connected to the carrier plate 2 in the region of the shell. A switch block 51, with which the various functional components of the vehicle door, such as the window lifter, may be operated, is also disposed on the shell.

The door body 1 is covered on the side toward the interior of the vehicle by a two-part inner door panel 5a, 5b, of which one part 5a has among other things an air intake 55 and a speaker cover 56, whereas a cover for the air bag unit 30 and an arm rest are formed on the second part 5b of the inner door panel.

Because of the connection of the pull handle 50 with the guide rail 37a on the one hand and the carrier plate 2 on the other, a stable attachment of the pull handle 50 on the door body 1 is guaranteed without any special additional reinforcement zones having to be provided for this purpose. Instead, the stably designed guide rail 37a and the carrier plate 2 are used to attach the pull handle 50.

Thus, with a reduced number of parts, the required stability of the door is easily guaranteed. In addition, the pull handle 50 also acts as a cross strut, which runs from the guide rail 37a across a part of the cutout 101 to the carrier plate 2 and thus contributes to the stabilization of the door body 1.

FIGS. 2 through 5 show several views of a door body comparable to that of FIG. 1 from the vehicle interior (dry area), whereby the door body is depicted only schematically. Moreover, in FIGS. 2 through 5, the inside panel of the door body and the inner door panel, respectively, are depicted as transparent, to render the components placed behind the inside panel of the door and the inner door panel in the wet area of the vehicle door visible (especially the window lifter).

Figure 2:
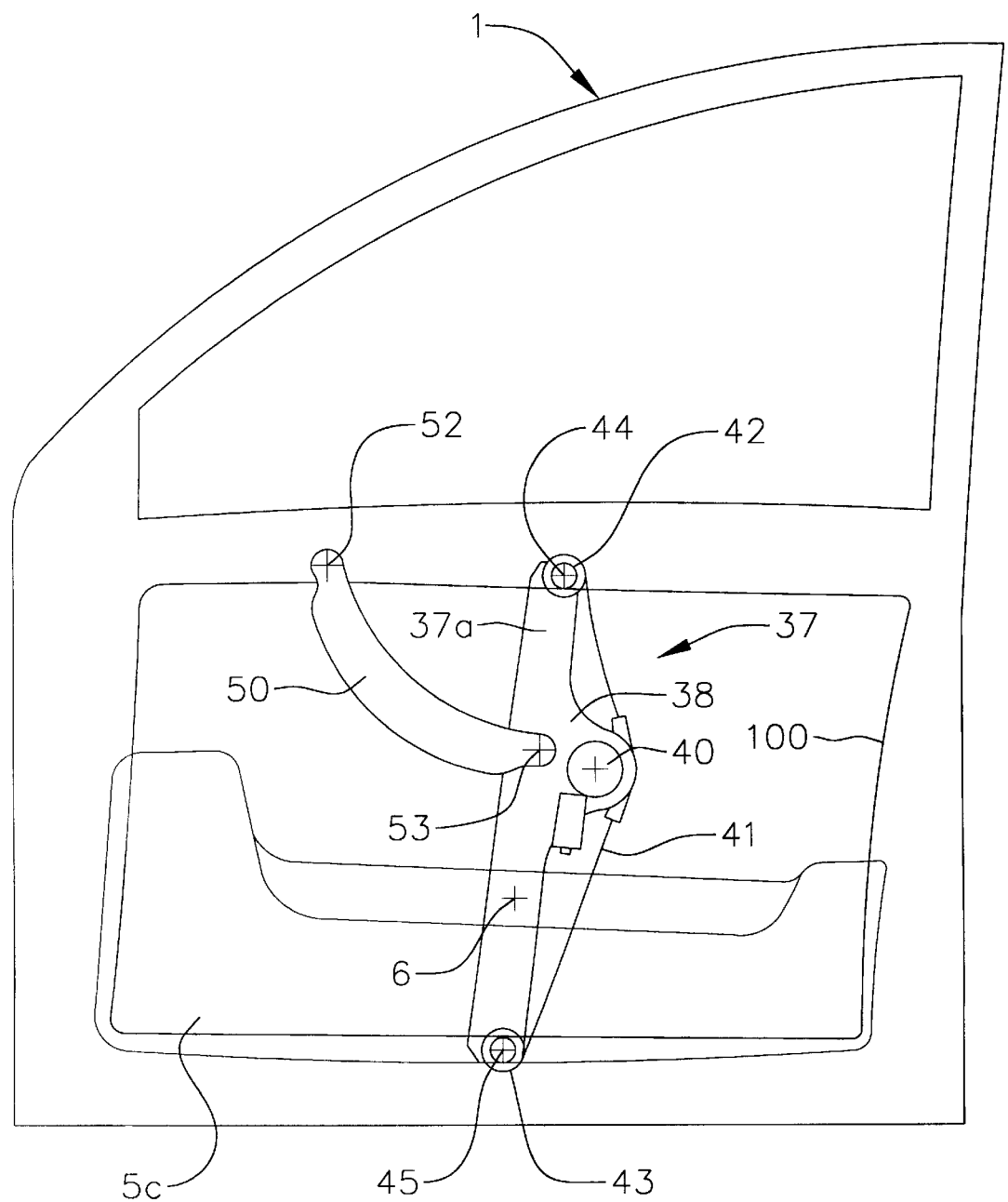
FIG. 2 a schematic depiction of a door body with a guide rail on which a pull handle and an inner door panel are attached.

According to the exemplary embodiment in FIG. 2, a large cutout 100 is provided in the inside panel of the door body 1, which cutout is partially covered by an inner door panel 5c.

On the wet area side of the cutout 100, a guide rail 37a of a window lifter 37, on which a base plate 38 is formed to accommodate the window lifter drive 40, runs between a lower attachment point 43 and an upper attachment point 44 of the door body 1. The window lifter drive 40 drives a drive cable 41, which is guided over cable guide rollers 42, 43 along the guide rail 37a and is connected to a carrier (not shown in FIG. 2) which is displaceable along the guide rail 37a and with which the window pane to be regulated is coupled.

Referring to FIG. 2, it is also possible to see that the guide rail 37a is attached to the door body 1 in a known fashion through the axles of the cable guide rollers 42, 43.

For one thing, according to the invention, an attachment point 53 is provided on the guide rail 37a, by means of which attachment point a pull handle 50 of the vehicle door is connected to the guide rail 37a. The pull handle 50 is, moreover, connected directly to the door body 1 by means of an attachment point 52 provided in a shaft area of the door body 1. Thus, a stable attachment of the pull handle 50 to the vehicle door is achieved without the necessity of special additional reinforcement zones for this. Furthermore, the pull handle 50 itself contributes to the stabilization of the door body 1 since it extends like a cross strut over part of the large cutout 100 in the door body 1.

Moreover, stabilization of the inner door panel 5c is achieved through the connection between the inner door panel 5c and the guide rail 37a at a connection point 6.

Figure 3:
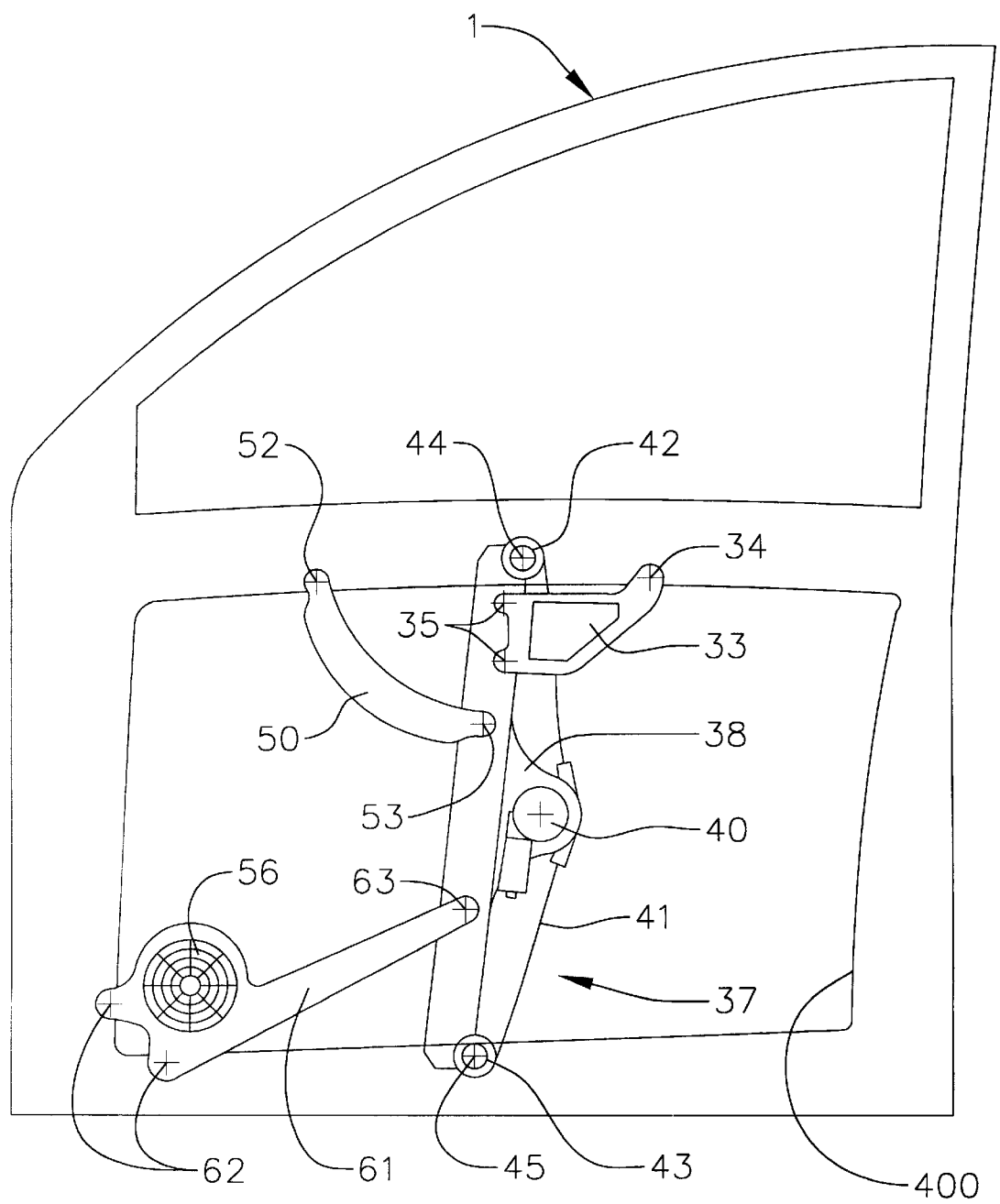
FIG. 3 a schematic depiction of a door body with a guide rail on which a pull handle, a door control device, and a speaker are attached.

FIG. 3 depicts a modification of the vehicle door shown in FIG. 2. Corresponding components are identified here with the same reference characters as in FIG. 2, such that in the following only the difference relative to FIG. 2 is discussed.

According to FIG. 3, a carrier element 61, made preferably of metal or a fiber-reinforced plastic and on which a speaker provided with a cover 56 is disposed, extends from the guide rail 37a to a corner region of the door body 1. Here, the carrier element is connected to the guide rail 37a by an attachment point 61 and to the door body 1 by two attachment points 62. Since the carrier element extends partially over the cutout 100 in the door body, it contributes to the stabilization of the vehicle door.

The same is also true for the door control device 33, which is disposed in a housing which is watertight and preferably made of fiber-reinforced plastic and extends into the wet area of the vehicle door over a portion of the cutout 100 from the guide rail 37a to the shaft region of the door body 1. The door control device 33 is connected to the shaft region of the door body 1 by an attachment point 34 and to the guide rail 37a of the window lifter 37 by two attachment points 35.

Overall, by means of the above-described connection of the door control device 33, of the pull handle 50, and of the carrier element 61 provided with the speaker to the guide rail 37a on the one hand and to the door body 1 on the other, a three-fold additional reinforcement of the vehicle door is obtained in the region of the cutout 100.

Figure 4:
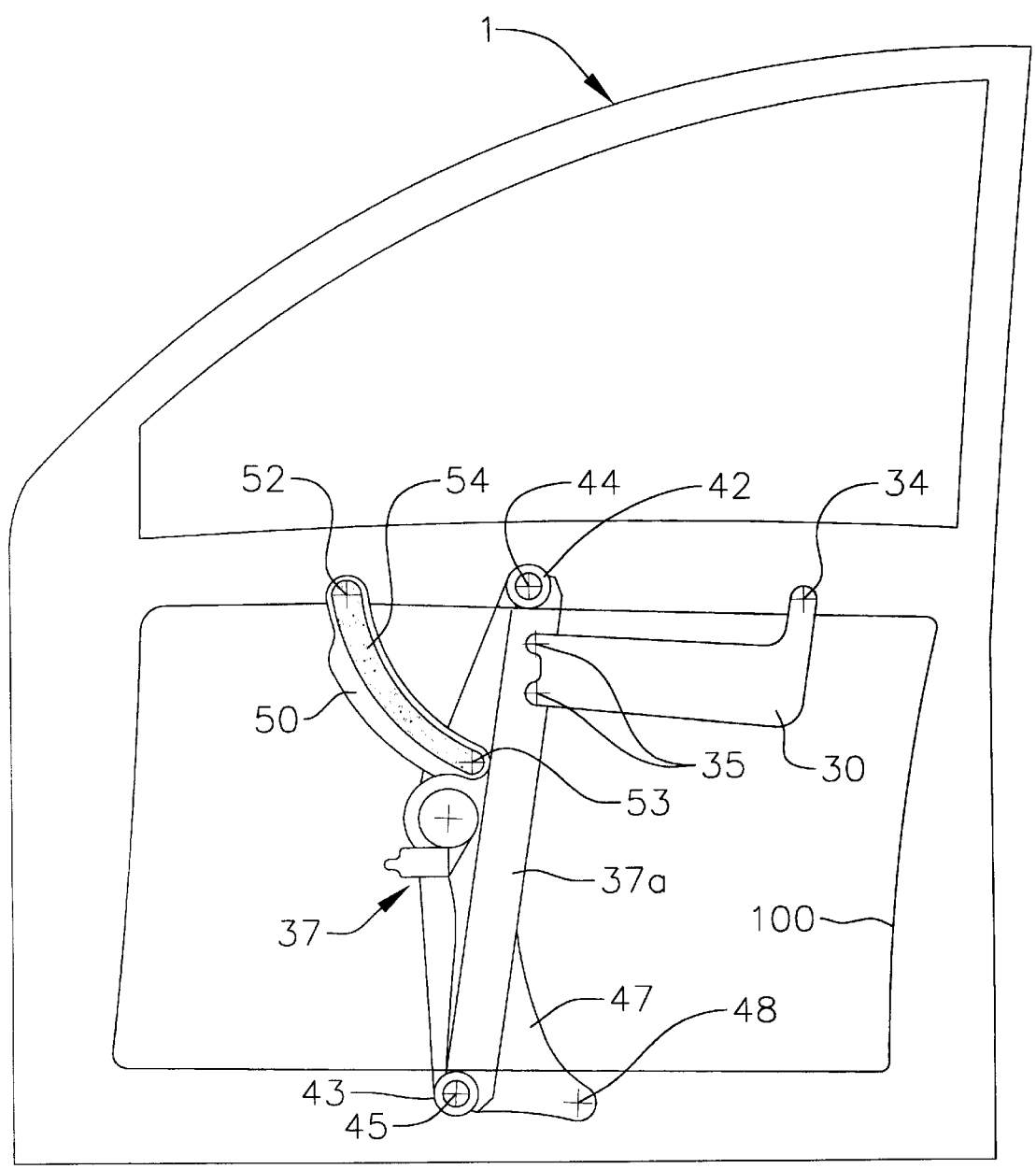
FIG. 4 a schematic depiction of a door body with a guide rail on which a pull handle and a side air bag are attached.

In the exemplary embodiment of the invention depicted in FIG. 4, the pull handle 50 extending from the guide rail 37a to the door shaft is also provided with a mechanical reinforcement element 54, which may be, for example, an extrusion-coated metal rail.

Furthermore, the housing of an air bag unit 30, which is connected to the guide rail 37a by two attachment points 35 and to the shaft region of the door body 1 by one attachment point 34, extends from the guide rail 37a to the shaft region of the door body 1.

The guide rail 37a has in its lower section a widened section 47 extending essentially in the plane of the door, which is also connected to the door body 1 by an attachment point 48. Thus, in the lower region of the vehicle door, an additional reinforcement of the door body is obtained in the region of the cutout 100.

In the upper region of the cutout 100, this reinforcement is guaranteed by the pull handle 50 on the one hand and the side air bag 30 on the other, which respectively extend over a portion of the cutout 100 and thus act as cross struts.

The pull handle 50, the guide rail 37a, and the widened region 47 form a pull unit which extends diagonally across the entire cutout 100. Thus, an extraordinary increase in the stability of the door body is achieved, which is particularly significant in the event of a crash.

Figure 5:
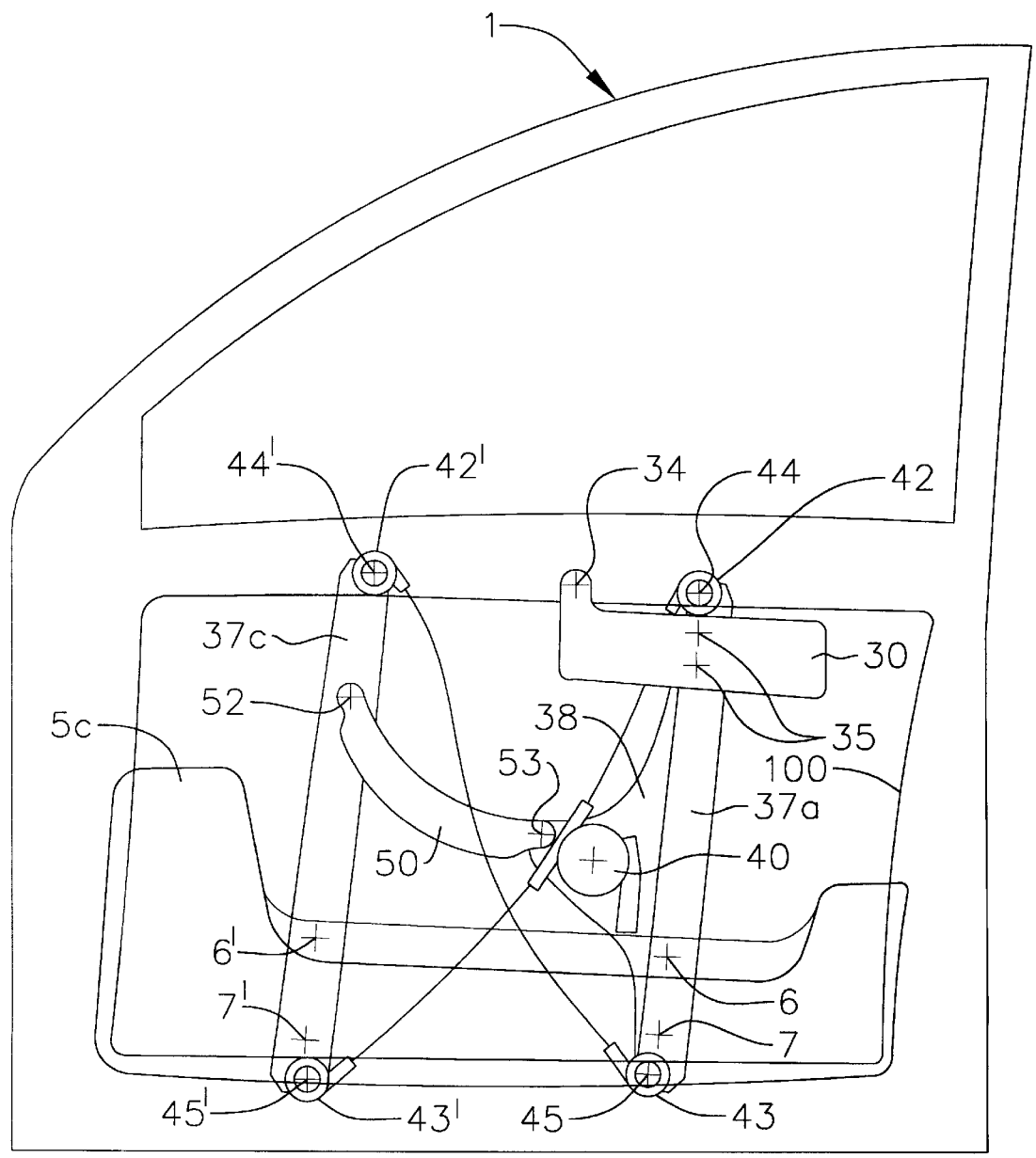
FIG. 5 a schematic depiction of a door body with two guide rails on which a pull handle, an air bag unit, and an inner door panel are attached.

FIG. 5 schematically depicts a variant of a door body 1 in which a two-strand cable window lifter 37 is disposed. This includes two guide rails 37a, 37c running parallel to each other which have, respectively, at their ends guide rollers 42, 43 and 42', 43', through whose respective axles 44, 45 and 44', 45' the guide rails 37a, 37c are connected at both their ends to the door body 1.

Each of the two guide rails 37a, 37b, also has two attachment points 6, 7 and 6', 7', respectively, in its lower region, by means of which the guide rails 37a, 37c are connected to an inner door panel 5c. The guide rails 37a, 37c may, consequently, be combined to form a preassembled unit, which can be incorporated preassembled into the body 1 of a vehicle door.

This preassemblable unit is reinforced by a pull handle 50 which extends from the carrier plate 38 of the first guide rail 37a to the second guide rail 37c and is connected by attachment points 53 and 52, respectively, to both guide rails 37a, 37c. The preassemblable unit may also include all other functional units of the two-strand window lifter 37, such as the drive 40 and the drive cable 41, in particular.

In the upper region of the first guide rail 37a, additional reinforcement is achieved by means of an air bag unit 30, which extends from the door shaft of the door body 1 to the upper end of the guide rail 37a.

Because of the fact that the inner door panel 5c is connected to the guide rails 37a, 37c by a total of four attachment points 6, 6', 7, 7', an additional direct attachment of the inner door panel to the door body 1 itself is unnecessary. The preassemblable unit, which consists of the inner door panel 5c and the window lifter 37, can, consequently, be attached simply to the door body 1, in that the guide rails 37a, 37c of the window lifter 37 are connected to the door body at the attachment points 44, 44', 45, 45' provided for this. No additional assembly steps are necessary.

What is claimed is:

1. A motor vehicle door comprising:
   a door body having an inner door panel, and
   a window lifter disposed in the door body,
      wherein the lifter includes a rigid guide rail on which a carrier for a window pane can be displaceably disposed and a window lifter regulating mechanism,
      wherein the guide rail has a first end and a second end, both ends connected to the door body at different locations to stabilize the door,
      wherein at least one functional element which is not part of the regulating mechanism of the window lifter is connected to both the guide rail and the door body,
      wherein the door body defines an access opening and the guide rail is connected to the door body across the access opening,
      wherein the access opening has edges along its perimeter, wherein the edges include first and second edges,
      wherein the door body has a first location adjacent the first edge of the access opening, and a second location across the access opening from the first location and adjacent the second edge of the access opening,
      wherein the first end of the guide rail is connected to the door body at the first location, and the second end of the guide rail is connected to the door body at the second location.

2. The motor vehicle door according to claim 1, wherein the functional element is connected to at least one of the guide rail and the door body by at least one additional component.

3. The motor vehicle door according to claim 2 wherein the functional element is disposed on a carrier element by means of which it is connected to at least one of the guide rail and the door body.

4. The motor vehicle door according to claim 8, wherein the carrier element is connected to both the guide rail and the door body.

5. The motor vehicle door according to claim 1 wherein the functional element extends at least partially over a large cutout in the door body.

6. The motor vehicle door according to claim 1 wherein a reinforcement of the door body is achieved through the arrangement of the functional element in the door body, whereby the functional element is not provided primarily as a reinforcement element.

7. The motor vehicle door according to claim 1 wherein the functional element is connected to the door body not only by a guide rail.

8. The motor vehicle door according to claim 1, wherein the guide rail has on its ends guide elements for a pulling means running along the guide rail and that the guide rail is connected to the door body by the axles of the guide elements.

9. The motor vehicle door according to claim 1 wherein the functional element is designed as a door handle.

10. The motor vehicle door according to claim 1 wherein the functional element is designed as an electronic control unit or as a speaker.

11. The motor vehicle door according to claim 1 wherein the functional element is designed as a side air bag.

12. The motor vehicle door according to claim 1 wherein a base plate is formed on the guide rail to accommodate the drive arrangement of the window lifter and that at least one attachment point for the functional element is provided on the base plate.

13. The motor vehicle door according to claim 1 wherein the guide rail has on at least one of its end regions a widened area extending essentially along the plane of the door, which widened area is connected to the door body by at least one attachment point.

14. The motor vehicle door according to claim 1 wherein the window lifter includes two guide rails and the functional element is connected to both guide rails.

15. A motor vehicle door according to claim 1 wherein at least one part of the inner door panel is connected to the guide rail.

16. The motor vehicle door according to claim 15, wherein at least one part of the inner door panel is preassemblably attached to the guide rail.

17. The motor vehicle door according to claim 15 wherein the inner door panel is attached exclusively to the guide rail.

18. The motor vehicle door according to claim 1 wherein the guide rail has on at least one of its end regions a widened area extending essentially along the plane of the door, which widened area is connected to the door body by two attachment points.

19. The motor vehicle door according to claim 1 wherein the second end of the guide rail is spaced at a distance from the first end in a substantially vertical direction along a length of the guide rail.

20. The motor vehicle door of claim 1 wherein the at least one functional element includes at least one of a door pull handle, a speaker, an air bag unit, and a door control device.

21. The motor vehicle door of claim 1 wherein the second location is below the first location.

22. A motor vehicle door comprising:
- a door body having a first location, a second location below the first location, and a third location spaced from the first and second locations;
- a window lifter disposed in the door body, and having a window lifter regulating mechanism and a rigid guide rail on which a carrier for a window pane can be displaceably disposed, wherein the guide rail has a top end connected at the first location and a bottom end connected at the second location such that the guide rail forms a rigid support for the door body; and
- a functional element having a first end connected at the third location and a second end connected to the guide rail between the top end and the bottom end of the guide rail such that the functional element forms a rigid support between the door body and the guide rail, wherein the functional element is not a part of the regulating mechanism of the window lifter.

23. The motor vehicle door of claim 22 wherein the door body defines an access opening and the guide rail is connected to the door body across the access opening,
- wherein the access opening has edges along its perimeter, wherein the edges include first and second edges,
- wherein the first location is adjacent the first edge of the access opening, and the second location is across the access opening from the first location and adjacent the second edge of the access opening.

* * * * *